T. J. CONVERSE.
STEAM WHISTLE OPERATING MECHANISM.
APPLICATION FILED MAR. 13, 1920.
1,396,096.
Patented Nov. 8, 1921.
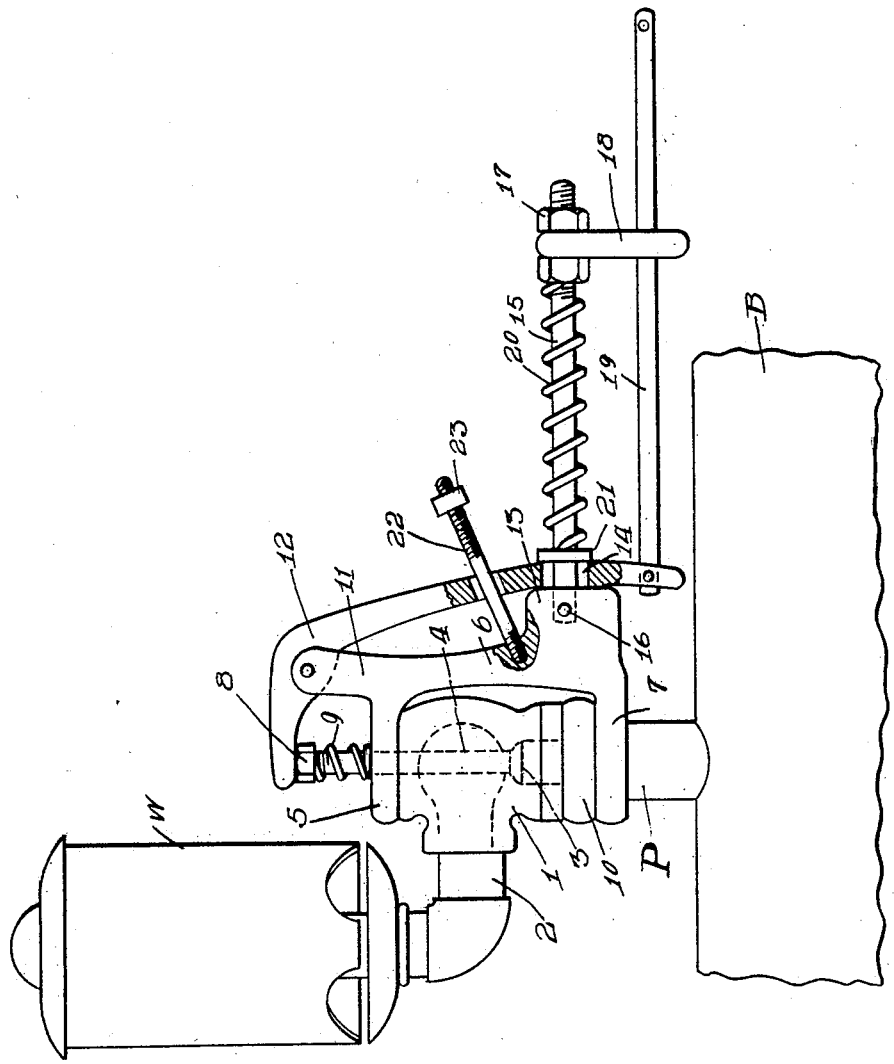
Inventor
T. J. Converse.
Witness
By C. A. Snow & Co.
Attorneys

UNITED STATES PATENT OFFICE.

TOMMY J. CONVERSE, OF BELLINGHAM, WASHINGTON.

STEAM-WHISTLE-OPERATING MECHANISM.

1,396,096.  Specification of Letters Patent.  Patented Nov. 8, 1921.

Application filed March 13, 1920. Serial No. 365,521.

*To all whom it may concern:*

Be it known that I, TOMMY J. CONVERSE, a citizen of the United States, residing at Bellingham, in the county of Whatcom and State of Washington, have invented a new and useful Steam-Whistle-Operating Mechanism, of which the following is a specification.

This invention relates to mechanism primarily designed for operating the signal whistles of donkey engines such as used in logging, one of the objects of the invention being to provide means whereby the operating wire or cord, which sometimes extends a thousand feet or more, is connected to the mechanism close to the boiler so that a pull thereon due to a falling tree or the like will not tend to break the part on which the whistle is mounted.

A further object is to provide operating mechanism of this character which is simple, compact and durable, can be adjusted readily, and can be operated by a cord or wire extending in any direction from the mechanism.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawing the preferred form of the invention has been shown.

Said drawing is a view in side elevation of the present improvement applied to a whistle, a part being broken away.

Referring to the drawing by characters of reference B designates a portion of a boiler having a short outlet pipe P extending therefrom. This pipe opens into a valve casing 1 having a branch 2 on which the whistle W is secured. A valve 3 is arranged in the casing 1 and at the lower end of a stem 4, said stem projecting upwardly beyond the casing 1 and through the upper arm 5 of a yoke 6 which straddles the casing 1 and has its lower arm 7 mounted on the tube or pipe P.

A nut 8 is mounted on the threaded upper end of the stem 4 and constitutes an abutment for the coiled spring 9 one end of which bears downwardly on the arm 5 of the yoke. A suitable spacing washer 10 may be interposed between the arm 7 of the yoke and the base of the casing 1.

An ear 11 extends upwardly from the yoke 6 and pivotally mounted thereon is a lever 12 one end of which bears downwardly on the upper end of the stem 4 while the other end extends downwardly and is adapted normally to contact with a boss 13 formed on the lower portion of the yoke 6. This downwardly extending portion of the lever has a slot 14 through which extends a guide stem 15 pivotally connected to the boss 13 as shown at 16 and provided, at its free end, with spaced nuts 17 mounted on the threaded portion of the stem. Secured between these nuts is a depending guide plate 18 in which is slidably mounted a rod 19 one end of which is pivotally connected to the lower end of the lever 12, as shown. A spring 20 is mounted on the stem 15 and bears at one end against one of the nuts 17 and at its other end against a washer 21 which is slidably mounted on the stem 15 and presses against the lever 12.

The wire or cord for operating the whistle is adapted to be connected to the free end of the rod 19. When said rod is pulled longitudinally it will be guided by the plate 18 and will cause lever 12 to swing against the spring 20. During this action the upper end of the lever 12 will press downwardly on the valve stem 4 and cause the valve 3 to be unseated downwardly within the casing 1, thus releasing the pressure to the whistle W. During this action the spring 9 is of course placed under increased compression. As soon as the rod 19 is released the springs 20 and 9 will return the respective parts to their initial positions, spring 9 assisting in the seating of the valve 3. Obviously the compression of the springs can be regulated by the nuts constituting abutments therefor. The stem 15 constitutes a guide for the lever 12 so that it will always operate in the proper plane and cannot shift so as to get out of operative relation with the stem 4.

By utilizing apparatus such as described the power is applied to the whistle mechanism at a point close to the boiler and the danger of breaking off the whistle or any parts connected thereto is eliminated. Furthermore there is no danger of the whistle valve becoming hung.

For the purpose of regulating the movement of the lever 12 and correspondingly regulating the size of the whistle blast, a threaded stem 22 is extended from the yoke and is slidably engaged by the lever 12, this stem being engaged by a nut 23 constituting an abutment against which the lever 12 will move.

What is claimed is:

1. The combination with a boiler having an outlet, a valve casing connected to the outlet, and a whistle for receiving pressure from the casing, of a valve in the casing and having the stem projecting therebeyond, yielding means engaging the stem for holding the valve normally on its seat and shutting off the escape of pressure to the whistle, a lever having one end in position to actuate the stem and its other end extending toward the boiler, means connected to said lever and close to the boiler for actuating the lever to unseat the valve, a guide slidably engaged by the lever, and yielding means on the guide for holding the lever normally in a predetermined position.

2. The combination with a valve casing having an outlet and an inlet, and a whistle connected to the outlet, of a yieldingly held valve normally seated in the casing, a yoke connected to the casing, a lever fulcrumed thereon, means on the yoke constituting an abutment for the lever to limit its movement in one direction, a guide extending from said means and slidably engaged by the lever, yielding means for holding the lever normally against said abutment, and means for actuating the lever to unseat the valve.

3. The combination with a valve casing having an outlet and an inlet, and a whistle connected to the outlet, of a yieldingly held valve normally seated in the casing, a yoke connected to the casing, a lever fulcrumed thereon, means on the yoke constituting an abutment for the lever to limit its movement in one direction, a guide extending from said means and slidably engaged by the lever, yielding means for holding the lever normally against said abutment, and means for actuating the lever to unseat the valve, said means including a slidable rod pivotally connected to the lever, and a guide adjustably connected to and extending from the lever guide.

In testimony that I claim the foregoing as my own, I have hereto affixed my signature in the presence of two witnesses.

TOMMY J. CONVERSE.

Witnesses:
J. C. NICHOLS,
G. L. MORGAN.